United States Patent

Jache

[11] 3,919,371
[45] Nov. 11, 1975

[54] LEAKPROOF BONDING OF STORAGE BATTERY COMPONENTS

[76] Inventor: Otto Jache, Thiergarten, Budingen, Hesse, Germany

[22] Filed: Sept. 18, 1972

[21] Appl. No.: 289,862

Related U.S. Application Data

[63] Continuation-in-part of Ser. No. 55,934, July 17, 1970, abandoned.

[30] Foreign Application Priority Data

July 17, 1969 Germany............................ 1936472

[52] U.S. Cl. .................. 264/46.6; 136/176; 264/54; 264/262; 264/263; 264/272; 264/328; 264/DIG. 83
[51] Int. Cl...... B29c 27/00; B29d 27/00; B29f 1/06
[58] Field of Search ...... 264/45, 263, DIG. 83, 268, 264/272, 328, 262; 136/176; 156/79

[56] References Cited
UNITED STATES PATENTS

| | | | |
|---|---|---|---|
| 3,151,427 | 10/1964 | Meissner et al................... | 156/79 X |
| 3,166,831 | 1/1965 | Keith............................. | 156/79 UX |
| 3,258,369 | 6/1966 | Blaica............................ | 264/263 X |
| 3,264,394 | 8/1966 | Gohl............................. | 264/263 |
| 3,268,636 | 8/1966 | Angell........................... | 264/DIG. 83 |
| 3,269,865 | 8/1966 | Swanson......................... | 136/176 UX |
| 3,386,860 | 6/1968 | Maier............................ | 136/176 |
| 3,436,446 | 4/1969 | Angell........................... | 264/DIG. 83 |

OTHER PUBLICATIONS

Whittington, Lloyd R., "Whittington's Dictionary of Plastics," Stamford, Conn., Technomic, c 1968, pp. 179–181.
Czerski, J., "Injection–Moulded Foams," in Plastics & Polymers, December 1971, pp. 406–411.
Weir, Clifford L., "The Action is Swinging to Structural Foams," in Plastics Technology, April 1972, pp. 37–41.

*Primary Examiner*—Philip E. Anderson
*Attorney, Agent, or Firm*—Shlesinger, Fitzsimmons & Shlesinger

[57] ABSTRACT

Metallic and/or thermoplastic components of a storage battery are fluid-tightly connected by means of a multicellular thermoplastic sealing member formed by injection of a foamable thermoplastic resin composition containing a foaming agent into a cavity provided between the components to be connected together.

8 Claims, 9 Drawing Figures

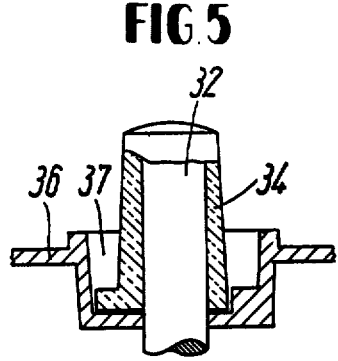
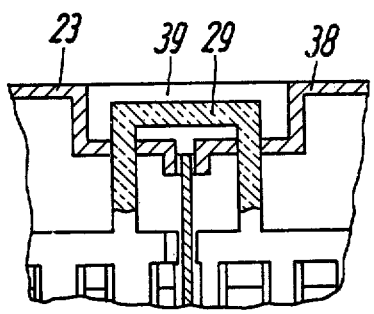
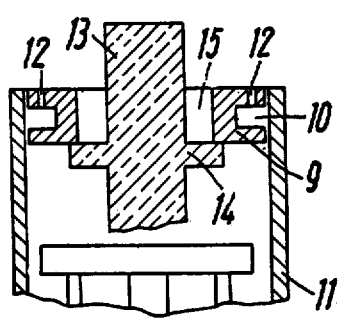
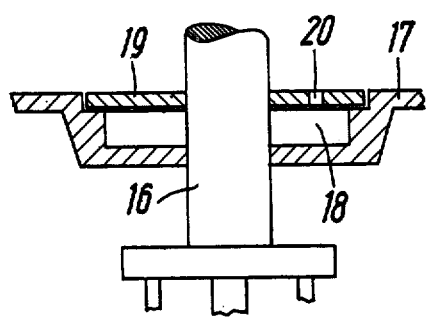

LEAKPROOF BONDING OF STORAGE BATTERY COMPONENTS

The present application is a continuation-in-part of application Ser. No. 55,934 filed July 17, 1970, now abandoned, entitled "Method of Bonding Components of an Electrical Storage Battery in Leakproof Relation."

The present invention relates to the leakproof bonding of components of an electrical storage battery, and particularly to the leakproof bonding of storage battery components made of thermoplastic material either to other components made of substantially the same material or to current-carrying components made of metal such as lead.

It is already known to secure a cover made of thermoplastic material to a storage battery casing made of the same material by injecting into a hollow space provided between the casing and the cover a liquid thermoplastic material which forms a rigid bond after solidification. In order to achieve a sound bond it is necessary to use a high injection pressure to ensure complete filling of the hollow space with thermoplastic material. Therefore, the regions of the casing and the cover which are subjected to the high injection pressures must possess great mechanical strength to avoid deformations and cracks. The great mechanical strength required necessitates the use of casings and covers having relatively thick walls. Furthermore, internal stresses may be created in the bond as a result of uneven solidification of the injected thermoplastic material. These internal stresses may result in a premature failure of the storage battery.

It has been also proposed to provide a fluid-tight seal between a thermoplastic battery wall and a current-carrying lead element by filling the space between the battery wall and the lead element with a solidifying plastics material. When such a seal is subjected to frequent sudden temperature changes, tension cracks may occur within the plastics material or the plastics material may be torn off from the metal as a result of the very uneven volume changes of the metal and the plastics material.

It is an object of the present invention to provide sealing means between components of an electrical storage battery which are leakproof and stable. A further object of this invention is the provision of an improved method of bonding storage battery components made of metal and/or resinous thermoplastic material in which a multicellular thermoplastic resinous mass having closed cells is provided to form a substantially stress-free tight joint between the components.

Other objects of this invention will be apparent during the course of the following detailed description.

According to the present invention components of an electrical storage battery are bonded together in leakproof relation by assembling the components into relative positions wherein a cavity is provided between those regions of the components at which the components are to be bonded together, injecting into the cavity a foamable thermoplastic resin composition rendered expandable by addition of a foaming agent, and allowing the injected thermoplastic resin composition to expand to a multicellular mass having closed wall cells and to solidify whilst maintaining said components in their relative positions. As only a low pressure is exerted on the walls of the cavity by the thermoplastic resin composition during injection and the following expansion within the cavity there is no need for reinforcing the components surrounding the cavity. Although the foaming or swelling pressure of the expanding thermoplastic resin composition is relatively low, the resulting multicellular mass penetrates all voids within the cavity and firmly adheres or is fused to the walls of the components which are preferably made of thermoplastic material or metal. Thus the multicellular sealing member produced from the foamed up thermoplastic resin composition and its subsequent solidification ensures a tight joint between the components. If desired, solidification of the expanded thermoplastic resin composition may be accelerated by cooling. The volume of the closed-wall cells within the foamed up mass is variable within a wide range and depends on the operational characteristics (amount of foaming agent added to the thermoplastic resin composition, viscosity of the plastified thermoplastic resin composition, injection rate etc.). It is possible to obtain multicellular sealing members having a specific gravity as low as 0.45 grams per cubic centimeter.

The bonding method according to the present invention is superior to the known methods of bonding storage battery components made of thermoplastic material either to other thermoplastic components or to metallic components. This superiority is due to the fact that the resulting one piece molded multicellular sealing member between the components has thermal properties which are by far better than that of compact thermoplastics i.e. thermoplastics which do not contain cells. The multicellular sealing member is flexible and can easily take up volume changes of embedded metal components when subjected to sudden temperature changes. The multicellular sealing member is able to counteract and to absorb the volume shrinkage occurring during the transition from the plastic into the solid phase and upon further cooling so that no stresses are transmitted to the components adhering and/or fused to the solidifying foamed thermoplastic resin composition.

The foamable thermoplastic resin composition is plastified by heating prior to injection. It is preferred to pressurise the thermoplastic resin composition during plastification to counteract the pressure of the gas bubbles which are generated by the admixed foaming agent during heating. Conventional injection molding machines may be used for plastifying and injecting the thermoplastic resin composition capable of expansion. It is preferred to use a screw extruder or an extruder feeding a shooting cylinder. To avoid long feeding distances, the plastified thermoplastic material may be injected into the cavity through two or more injection nozzles. It is also possible to use several shooting cylinders which are fed by a common screw extruder to fill several cavities simultaneously and independently of each other.

The volume of the foamable thermoplastic resin composition injected into a given cavity is less than the volume of the cavity. Complete filling of the cavity with a multicellular thermoplastic mass is effected by gases expanding within the injected thermoplastic resin composition. All known thermoplastic materials whihc are used for manufacturing casings of electrical storage batteries may be used as starting material for forming a multicellular sealing member in accordance with the present invention. It is preferred to use as starting material substantially the thermoplastic material of which the storage battery casing is made.

The term thermoplastic material or resin composition as used herein in intended to designate resinous or polymeric compositions or materials of thermoplastic character which are solid at ambient temperature and which can be softened or melted by application of heat. Various ones of the many available thermoplastic polymeric compositions or materials may be employed in the practice of the invention. Typical examples are polymers and copolymers of olefine compounds such as polyethylene and polypropylene; polystyrene; copolymers of styrene with acrylonitrile and/or butadiene; vinyl resins such as polyvinylchloride; and acrylic plastics. Polypropylene is a particularly preferred thermoplastic resin composition.

The starting material may be a granulated or powdered material into which a foaming agent is already incorporated or to which a foaming agent is added in the injection molding machine. The term foaming agent as used herein is intended to designate a substance which causes the thermoplastic polymeric composition or material when extruded, to expand and to become filled with fine gas bubbles. Suitable foaming agents are well known. Particularly desirable foaming agents are organic compounds which are heat decomposable to yield gases by heating to a temperature at which the thermoplastic material is in the molten state. A foaming agent which is preferably employed with polypropylene is azodicarbonamide. If the foaming agent is added to the thermoplastic material in the injection molding machine it is desirable to add also a substance ensuring a homogeneous distribution of foaming agent in the molten resin composition.

To provide a cavity between those regions of components at which the components are to be bonded together, the components may be so dimensioned and arranged that they completely enclose after assembly the cavity which is provided with at least one opening for injecting the thermoplastic resin composition capable of expansion. If required or of advantage, a mold comprising one or more sections is used adjacent the bonding region to close a cavity surrounding the bonding region.

Other advantages of the invention will be explained in the accompanying specification and drawings which describe examples of the manner in which the invention is carried out and in which:

FIG. 2 is a fragmentary cross-sectional view of a modified single cell storage battery to illustrate the manufacture of bonds between the casing and the cover and between the cover and a terminal;

FIG. 3 is a fragmentary cross-sectional view of a terminal projecting through the cover of an electrical storage battery to illustrate the manufacture of a bond between the terminal and the cover;

FIG. 5 is a cross-sectional view taken substantially on the line 5—5 in FIG. 4 through one of the terminals;

FIG. 6 is a fragmentary cross-sectional view of a modified trough structure containing an inter-cell connector of a storage battery of the type shown in FIG. 4;

Figure 1:
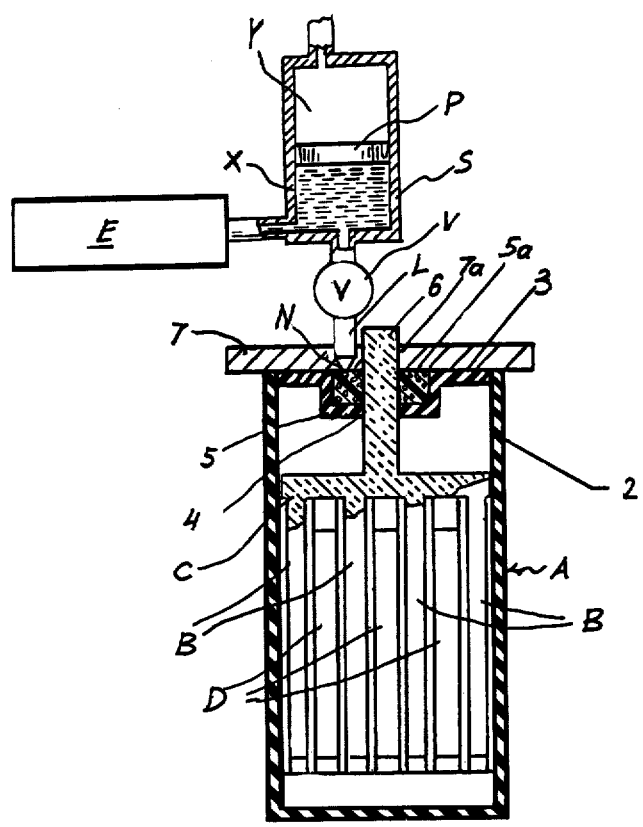
FIG. 1 is a cross-sectional view of a single cell storage battery to illustrate the manufacture of tight bonds between the cover and a terminal.

FIG. 1 shows a single cell storage battery of the lead-acid type comprising a casing A which is adapted to receive the elements of a single cell. The positive electrode plates B of the single cell are interconnected by a strap C. The negative electrodes D are also interconnected by a strap, not shown. After assembly of the cell elements within the casing A a cover 3 is inserted into the open end of the casing A and fluid-tightly joined to the side walls 2 of the casing A. The casing A and the cover 3 are made of polypropylene. The cover 3 has a recessed central portion 5 of circular cross-section. A positive terminal 6 made of lead and connected to the strap C fits through an opening 4 provided in the bottom wall of the recessed central portion 5 and projects from the cover 3. To form a leakproof connection between the cover 3 and the terminal 6 extending through the opening 4 in the recessed central portion 5 of the cover a mold plate 7 which is preferably made of metal such as aluminium is placed into abutting relationship with the outer surface of the cover 3 whereby the open side of the recessed central portion 5 is closed to provide a cavity 5a at the region where the terminal 6 extends through the cover 3. The mold plate 7 is provided with an opening 7a interfitting with the terminal 6.

In a specific example the polypropylene cover 3 has a thickness of 2.5 mm and the cavity 5a has a diameter of 10 mm and a depth of 15 mm. The terminal 6 has a diameter of 10 mm and the opening 4 in the cover and the opening 7a in the mold plate 7 have a diameter of 10 mm.

The mold plate 7 includes an injection nozzle N for introducing molten foamable polyethylene into the cavity 5a. The connecting line L between the injection nozzle N and the shooting cylinder S contains a valve V. The shooting cylinder S includes a piston P which divides the shooting cylinder into two chambers X and Y. A gas-expansible melt of polypropylene is prepared within the extruder E by heating a mixture of 99.5 percent by weight polypropylene and 0.5 percent by weight azodicarbonamide to a temperature of 240°C and maintaining the melt under a pressure of about 725 p.s.i. in order to prevent foaming. When the valve V is closed and the piston P is in its lowermost position melt is extruded into the chamber X by upward movement of the piston P against a back-pressure provided by pressurized fluid in the chamber Y. The back-pressure on the piston is also in the order of 725 p.s.i. When a volume of foamable melt corresponding to about 50 percent of the volume of cavity 5a has been charged into chamber X the valve V is opened and the melt within the chamber X is injected into the cavity 5a within a period of 0.05 sec by rapid downward movement of piston P.

During the injection and the following solidification step, the mold plate 7 is pressed by means not shown to the outer surface of the cover to keep the cavity closed. The pressure exerted on the mold plate is about 100 p.s.i. The melt injected into the cavity is foamed up by the incorporated gas-producing foaming agent to a multicellular mass which completely fills the cavity and which is fused with the polypropylene material of the cover. The foaming pressure exerted by the expanding melt on the cavity walls is about 75 p.s.i. The foamed polypropylene mass is caused to solidify by cooling the mold plate. The solidified multicellular polypropylene mass has a specific density of 0.45 grams per cubic centimeter and represents a one piece molded sealing member of multicellular polypropylene fused to the cover and strongly adhering to the terminal thereby providing an excellent fluid-tight connection. The mold plate 7 can be removed as soon as the multicellular polypropylene has cooled to a stable state.

In the embodiment shown in FIG. 2, a cover 9 is used which is provided with a groove 10 extending around the side face of the cover. The cover 9 is so dimensioned as to fit into the casing 11. After insertion of the cover 9 into the casing 11, the open side of the groove 10 is covered by the upper end portions of the side walls of the casing 11 whereby a cavity for receiving thermoplastic material capable of expansion is provided. Thermoplastic material capable of expansion can be injected into the groove 10 through passages 12 extending to the upper surface of the cover. A terminal 13 provided with an annular flange 14 projects through an opening 15 in the cover 9. The annular flange 14 is so dimensioned and arranged that it covers the lower end of the opening 15. The upper end of the opening 15 is covered by a mold plate, not shown, to close the opening 15 whereby a cavity for receiving thermoplastic material capable of expansion is provided. After assembly of the parts into the positions shown in FIG. 2, thermoplastic material capable of expansion is injected into the groove 10 and the opening 15 in the manner described in connection with FIG. 1 to provide firm bonds between the cover 9 and the housing 11 and between the terminal 13 and the cover 9.

FIG. 3 shows a terminal 16 projecting through a cover 17 which is provided with a recess 18 surrounding the terminal 16. The open end of the recess 18 is covered by a plate 19 to provide a cavity for receiving thermoplastic material capable of expansion. Plate 19 and cover 17 are made of thermoplastic material. To provide a leakproof bond between cover 17 and terminal 16 thermoplastic material capable of expansion is injected in the manner described in connection with FIG. 1 into the recess 18 through an opening 20 provided in the plate 19. The plate 19 firmly adheres to the resulting bond within the recess 18.

Figure 4:
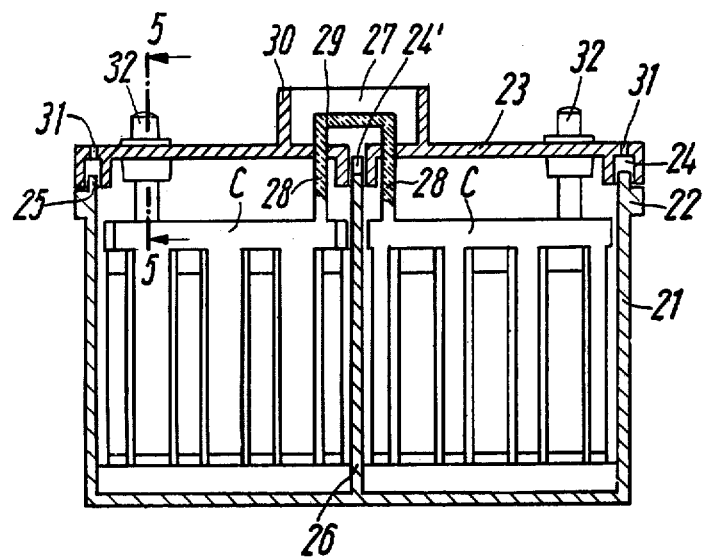
FIG. 4 is a cross-sectional view of a two-cell storage battery to illustrate the manufacture of tight bonds between the cover and the casing and an inter-cell connector and the partition wall.

FIG. 4 shows a two-cell storage battery with a casing 21 of molded thermoplastic material. A flange 22 is integrally molded with the casing and extends around the outer side of the casing near the open side thereof. The casing 21 is closed by a single integrally molded cover 23 which is provided with a peripheral groove 24 fitting over a tongue 25 projecting from the flange 22. The casing 21 is divided into two cell compartments by a transverse partition wall 26. The upper end of the partition wall 26 fits into a transverse groove 24' provided in the cover 23. The groove 24' communicates with the peripheral groove 24 and with a trough 27 which is surrounded by walls 30 projecting from the cover 23. A connector 29 disposed within the trough 27 is welded to posts 28 projecting from straps C of the adjacent cells. To bond the cover 23 to the casing 21 and to seal the posts 28 with respect to the cover 23, the trough 27 is covered by a mold plate, not shown, and plastified thermoplastic material rendered capable of expansion by admixture of a foaming agent is injected in the manner described in connection with FIG. 1 into the trough 27 and into the grooves 24' and 24 communicating with the trough 27. To avoid long feeding distance, thermoplastic material capable of expansion may be also injected through openings 31 communicating with the groove 24.

A cross-sectional view of one of the two terminals 32 is shown in FIG. 5. The terminal 32 is covered by a metal cap 34 which is welded to the terminal 32. The metal cap 34 fits into a recess 37 provided at those regions 36 of the cover at which the terminal 32 projects through the cover. To provide a leakproof seal, the recess 37 is covered by a suitable mold plate and thermoplastic material capable of expansion is injected into the recess 37 as described in connection with FIG. 1.

A modified trough structure containing a cell interconnector of a storage battery of the type shown in FIG. 4 is disclosed in FIG. 6. A trough 39 containing the connector 29 is provided by suitably recessing the cover 23. Thermoplastic material capable of expansion is injected into the trough 39 and into the groove 24' communicating therewith in the same manner as described in connection with FIG. 4.

Figure 7:
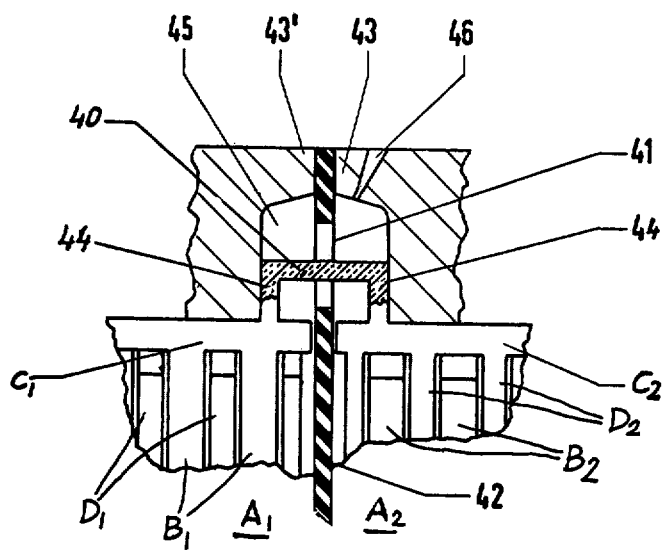
FIG. 7 is a fragmentary cross-sectional view to illustrate the manufacture of a sealing member between an inter-cell connector and a partition wall of an electrical storage battery.

FIG. 7 shows an inter-cell connector 40 passing through a transverse opening 41 provided in the partition wall 42 dividing an electrical storage battery casing, not shown, into two cell compartments. A cell group of positive plates $B_1$ or $B_2$ and of negative plates $D_1$ or $D_2$ is positioned in each cell compartment $A_1$ or $A_2$. The positive plates and the negative plates of each cell group are electrically connected together by metallic straps $C_1$ and $C_2$, respectively, The strap connecting the positive plates $B_1$ of the cell group in compartment $A_1$ is designated by reference symbol $C_1$ and the strap connecting the negative plates $D_2$ of the cell group in the other compartment $A_2$ is designated by reference symbol $C_2$. Each of the two adjacent straps $C_1$ and $C_2$ is provided with a terminal lug 44 extending upwardly in spaced relation to the partition wall 42. Each terminal lug 44 is cast integrally with the respective strap. The adjacent straps $C_1$ and $C_2$ are electrically connected by the inter-cell connector 40 extending between the terminal lugs 44. To provide a cavity 45 enclosing the opening 41 in the partition wall 42, a mold comprising two sections 43 and 43' is used. The sections 43 and 43' are arranged on opposite sides of the partition wall 42 to engage the partition wall 42, the terminal lugs 44 and the straps $C_1$ and $C_2$. Thermoplastic polymeric material capable of expansion is injected into the cavity 45 through an inlet opening 46 provided in the mold section 43, as explained in connection with FIG. 1. The injected thermoplastic material expands to a multicellular mass having closed-wall cells. The multicellular mass is allowed to become solid, resulting in a one piece molded sealing member fused to the partition wall 42 in the opening 41 and in the adjoining opposite surface areas. The inter-cell connector 40 is completely and the terminal lugs 44 are at least partially embedded in the multicellular sealing member. The sealing member strongly adheres to the metallic components.

Figure 8:
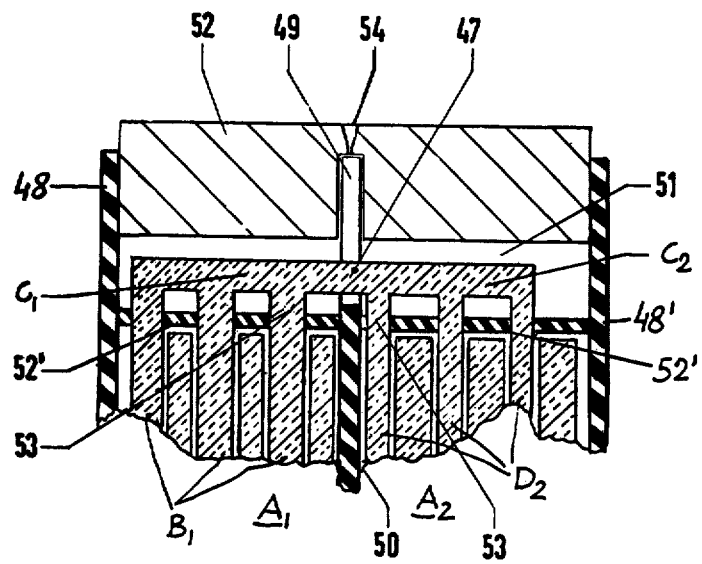
FIG. 8 is a fragmentary cross-sectional view to illustrate the manufacture of a sealing member between a partition wall, an inter-cell connector and straps of adjacent cells.

FIG. 8 shows an embodiment similar to that shown in FIG. 7 and, therefore, identical parts are designated by the same reference symbols. The straps $C_1$ connecting the positive plates $B_1$ in cell compartment $A_1$ and the strap $C_2$ connecting the negative plates $D_2$ in cell compartment $A_2$ are connected by inter-cell connector 47. The cell compartments $A_1$ and $A_2$ extend between partition or side walls 48 and 48' of a casing, not shown, and are separated by partition wall 50. The connector 47 extends in the same direction and has the same size as the straps $C_1$ and $C_2$ whereby a compact unitary structure ensuring a path of low electrical resistance is provided between the straps $C_1$ and $C_2$. The connector cast integrally with the straps extends through a notch 49 provided at the upper edge of the partition wall 50. To provide a leakproof seal between the cell compartments in the region of the notch 49 a mold 52 is used to close a cavity 51 containing the notch 49, the connector 47 and the straps $C_1$ and $C_2$. Insulating sheet members 52' are inserted into the space between the straps $C_1$ and $C_2$ and the electrode plates and are provided with suitably spaced slots to receive the plate lugs 53 connected to the straps $C_1$ and $C_2$. The mold 52 is then placed upon the sheet members 52' whereby the cavity 51 surrounding the notch 49, the connector 47 and the straps $C_1$ and $C_2$ is closed. The mold 52 is so dimensioned that the cavity 51 extends along two adjacent cell compartments and completely surrounds the two adjacent straps C1 and C2. The mold 52 is provided with an inlet opening 54 through which plastified thermoplastic resinous material rendered expandable by admixture of a foaming agent is injected into the cavity 51 as described in connection with FIG. 1. The resulting multicellular mass having closed-wall cells provides a sealing member fused to the partition wall 50 in the region within the notch 49 and in the adjoining surface areas and to the partition walls 48 and 48' in the regions opposite to the ends of the straps $C_1$ and $C_2$ and strongly adhering to the connector 47 and the straps $C_1$ and $C_2$. If desired, the mold 52 may be shaped to provide reinforcing ribs.

Figure 9:
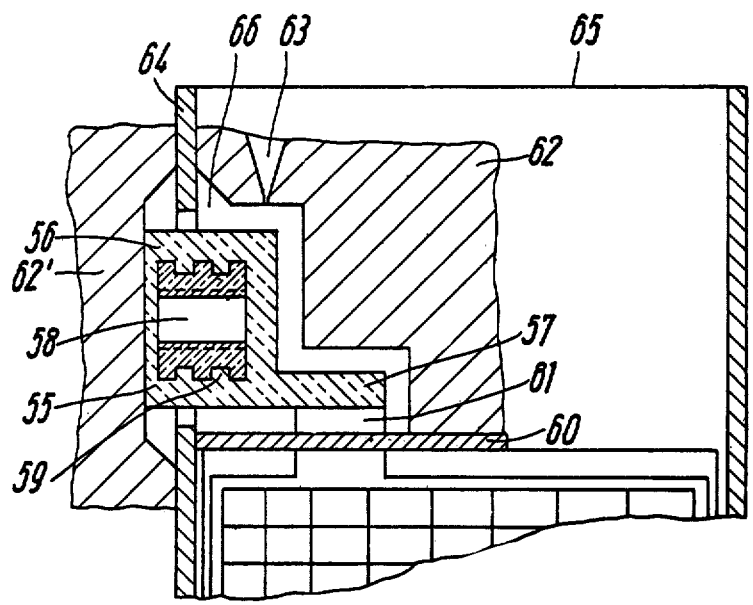
FIG. 9 is a fragmentary cross-sectional view to illustrate the manufacture of a sealing member between a terminal and a side wall of a casing of a storage battery.

In the emobidment shown in FIG. 9 the terminal 55 projects through an aperture in the side wall 54 of a casing of an electrical storage battery. The terminal 55 comprises a lead member 56 welded to a strap 57. The lead member 56 is provided with an insert 58 made of brass. Grooves 59 are provided at the outer side of the insert 58 to firmly secure the insert 58 to the lead member 56. An insulating plate 60 is disposed below the strap 57 to cover the cell compartment. The insulating plate 60 is provided with slots through which the plate lugs 61 project towards the strap 57. In order to produce a leakproof seal between the terminal 55 and the side wall 64 a mold comprising two sections 62 and 62' is so arranged that a cavity 66 containing the terminal 55 is provided. The mold section 62 is inserted into the battery casing to engage the insulating plate 60 and the side wall 64. The mold section 62' is disposed outside the casing around the aperture containing the terminal 55. After assembly of the mold sections 62 and 62' the resulting cavity 66 containing the terminal 55 is partly filled with plastified thermoplastic material capable of expansion which is injected through an inlet opening 63 in the mold section 63 as described in connection with FIG. 1. The injected thermoplastic material expands to a multicellular mass having closed-wall cells. The multicellular mass completely fills the cavity 66 and, after solidification, forms a sealing member between the terminal 55 and the side wall 64. The mold sections 62 and 62' can be removed as soon as the multicellular mass has solidified to a stable state.

What is claimed is:

1. A method of bonding components of an electrical storage battery in leakproof relation comprising assembling the components into a relative position wherein a cavity is provided between those regions of the components at which the components are to be bonded together, maintaining said components in said relative assembled position, injecting at low pressure into said cavity a quantity of plastified thermoplastic polymeric material having a volume which is less than that of said cavity, and which has been rendered gas-expandable by addition of a foaming agent, and continuing to maintain said components in said assembled position until the injected gas expandable foamed, plastified thermoplastic material has expanded to fill said cavity, and has solidified to a multicellular mass having closed cells adhered to said components.

2. The method as claimed in claim 1, wherein the cavity is surrounded at all sides by components of the storage battery.

3. The method as claimed in claim 1, wherein said components are made of substantially the same thermoplastic material as said plastified thermoplastic polymeric material and at least a part of the cavity is covered with a mold.

4. A method of bonding components of an electrical storage battery in leakproof relation, said components comprising a metallic inter-cell connector and a partition wall of the thermoplastic casing of said storage battery, said method comprising assembling said connector, said partition wall and a mold into a relative position wherein a cavity is provided within the assembly, said cavity being bound by at least parts of said components, maintaining said components and said mold in said relative assembled position, injecting into said cavity a plastified thermoplastic polymeric material which has been rendered gas-expandable by the addition of a foaming agent, and continuing to maintain said components and said mold in said assembled position until said foamed, gas-expandable injected plastified polymeric thermoplastic material has expanded at a pressure of approximately 75 p.s.i. to fill said cavity and has solidified to a multicellular mass fused to said partition wall and strongly adheres to said metallic inter-cell connector.

5. The method as claimed in claim 4, wherein the mold consists of two sections which are arranged on opposite sides of the partition wall to engage those regions of said partition wall and of said connector which are located adjacent to an opening in the partition wall surrounding the connector.

6. The method as claimed in claim 4, wherein said mold is arranged to confine a cavity containing in addition to said inter-cell connector the straps of adjacent cell groups electrically connected by said inter-cell connector.

7. A method of bonding a metallic terminal disposed in an aperture in a wall of an electrical storage battery casing made of thermoplastic material with said wall in leakproof relation, comprising the steps of placing a mold in a relative position around said aperture whereby a cavity containing said terminal and part of said wall is provided, injecting into said cavity a heated, plastified thermoplastic polymeric material which has been rendered gas-expandable by admixture therewith of a foaming agent, and continuing to maintain said mold in said position until the injected, foamed, gas-expandable, plastified thermoplastic material at a pressure of approximately 75 p.s.i. has expanded into a foamed mass having closed cells and filling said cavity, and, until said mass has cooled to a stable state, and then removing the mold.

8. The method of claim 7, wherein an insulating plate is inserted between a strap connected to said terminal and electrode plates connected to said strap to close said cavity, said electrode plates being provided with slots through which lugs, provided on the electrode plates, project to said strap.

* * * * *